2,767,151
Patented Oct. 16, 1956

2,767,151

COPOLYMERS OF ARYL OLEFINS AND ALPHA BETA ETHYLENICALLY UNSATURATED CARBOXYLIC ACID ESTERS OF OXIDIZED NONFROSTING SICCATIVE OILS

Lawrence H. Dunlap, Lancaster Township, Lancaster County, and Robert H. Reiff, Lancaster, Pa., assignors to Armstrong Cork Company, Lancaster, Pa., a corporation of Pennsylvania No Drawing. Application August 29, 1952,
Serial No. 307,175

23 Claims. (Cl. 260—20)

This application is a continuation in part of our application Serial No. 240,798, filed August 7, 1951, now abandoned, entitled "Copolymers of Aromatic Olefins and Alpha Beta Unsaturated Dicarboxylic Acid Esters of Oxidized Siccative Oils."

This invention relates to copolymers of aryl olefins and alpha beta ethylenically unsaturated carboxylic acid esters of oxidized nonfrosting siccative oils. More particularly, the invention relates to the production of such copolymers which are capable of use in the production of coatings and which are particularly adapted for use in the manufacture of floor coverings as a binder for the floor covering.

Copolymers of aryl olefins, such as styrene, with esters of fatty oils, are known in the art. For example, Tawney in Patent 2,505,844 discloses the production of copolymers of castor oil maleates with mono-olefinic compounds such as styrene. However, such a copolymer cannot be used to produce a suitable floor covering material by commercially acceptable methods.

We have found that aryl olefins may be reacted with alpha beta ethylenically unsaturated carboxylic acid esters of oxidized nonfrosting siccative oils to produce materials which may be compounded with pigments and fillers and possess excellent properties as a floor covering.

In accordance with our invention, any of a number of aryl olefins may be employed in carrying out the reaction. For example, the aryl olefin may be styrene, orthomethyl styrene, metamethyl styrene, paramethyl styrene, ethyl styrene, dimethyl styrene, alpha methyl styrene, parachlorostyrene, paramethoxy styrene, and the like. Generally speaking, particularly advantageous results have been obtained when styrene is the aryl olefin which is reacted with the ester of oxidized nonfrosting siccative oil. These aryl olefins are all well known vinyl aromatic compounds having the group

Among the alpha beta ethylenically unsaturated carboxylic acids which we may employ in producing the ester of oxidized oil are such dicarboxylic acids as maleic acid, fumaric acid, itaconic acid, and the like; and such monocarboxylic acids as acrylic acid, methacrylic acid, crotonic acid, sorbic acid, and the like. It is also within the scope of our invention to use cyclic aliphatic acids such as tetrahydrophthalic acid, which is an adduct of maleic acid and butadiene, the adducts of cyclopentadiene and dicyclopentadiene with maleic acid, and similar cyclic aliphatic acids. Of course, where possible, the anhydrides of the acids may be employed in the practice of our invention.

The oils employed in the practice of our invention are what are known in the art as nonfrosting siccative oils. Such oils include the vegetable drying oils and semidrying oils, such as linseed oil, soya bean oil, perilla oil, safflower oil, and the like. Our invention does not contemplate nondrying oils which, for the purposes of our invention, include material such as castor oil, inasmuch as nondrying oils are incapable of producing materials which possess the characteristics required of materials used as binders for floor coverings. Likewise, our invention does not contemplate the use of frosting drying oils such as China-wood oil, oiticica oil, and the like, because of the temperatures contemplated in the oxidation step of the process of our invention. Generally speaking, the temperatures are between room temperatures and heat bodying temperatures in order to obtain high oxidation with relatively low viscosity. When frosting oils are utilized under such conditions, the viscosity builds up too rapidly to permit obtaining the desired oxidation. The siccative oils used to advantage in the practice of our invention are those containing substantial quantities of linoleic acids. Generally speaking, the preferred oils contain at least about 35% natural nonconjugated linoleic acid and/or linolenic acid.

The oxidized oils are prepared under such conditions that a minor amount of polymerization takes place. This is accomplished by agitating the siccative oil in air in the presence of driers, such as napthenates, tallates and/or octoates of lead and/or manganese at a temperature such as bout 40° C. to about 150° C., advantageously about 60° C. to about 100° C. The oxidation is conducted to a viscosity above about 12 seconds Gardner-Holdt at 25° C. Generally speaking, we prefer to maintain the viscosity at not more than about 25 to 30 seconds Gardner-Holdt. This indicates that the conditions of oxidation are such that little polymerization has taken place. The oxidized oils are prepared in such a manner as to produce materials having a hydroxyl number in the range of about 30 to about 50. The hydroxyl numbers indicate the presence of hydroxyl groups resulting from oxidation of the unsaturated fatty acid chains and not from hydrolysis of the ester. In oxidation of the oils, peroxides are formed which decompose to give the hydroxyl groups.

In the esterification of the thus oxidized oils, the nonfrosting oxidized siccative oil is advantageously refluxed with the alpha beta ethylenically unsaturated carboxylic acid or its anhydride. The refluxing is generally carried out while the reactants are dispersed in an inert hydrocarbon solvent, such as benzene, toluene, xylene, and the like. The reflux temperatures are ordinarily between about 80° C. and about 150° C., advantageously between about 100° C. and about 120° C. Generally speaking, we find it advantageous to employ oxidized oil and acid in such proportions that the hydroxyl and carboxyl groups are present in approximately stoichiometrically equivalent ratios. In other words, we use .1 to .5 mol of alpha beta acid per fatty acid chain or acyl radical. Too much acid may cause excessive gel formation on subsequent esterification.

Esterfication is continued with or without catalysts, such as sulfuric acid, with removal of water until the acid number is reduced, preferably to about 15 or below.

In producing the copolymer, the aryl olefin constitutes about 33% to about 67% of the polymerizable mixture, the balance being the oxidized oil ester. Generally speaking, we find it advantageous to effect the polymerization by heating the reactants at elevated temperatures, such as about 60° to about 150° C., advantageously at temperatures of about 100° C. to about 120° C. Particularly advantageous results have been obtained by polymerizing a mixture containing about equal parts by weight of aryl olefin and oxidized oil. We prefer to effect copolymerization by refluxing the oxidized nonfrosting siccative oil ester with the aryl olefin while dispersed in an inert hydrocarbon solvent. Generally, the solvent is the same as that used in the esterification stage.

Our invention may be more readily understood by reference to the following specific examples, in which a comparison is made with products obtained by forming copolymers of styrene and castor oil esters.

*Example I*

200 parts by weight of castor oil and 3 parts by weight of maleic anhydride were refluxed in 200 volumes of toluene for 6 hours at 110° C. to 115° C. The resulting acid number was 7. The esters were reacted with styrene by refluxing with 200 grams of styrene and 2 grams of benzoyl peroxide. On removal of the solvent, a white solid and an oil were obtained. The product was obviously an incompatible mixture and no attempt was made to sheet it out.

*Example II*

200 grams of castor oil and 21 grams of maleic anhydride with 200 ml. of carbon tetrachloride were refluxed for 6 hours. The acid number was then 77. The mixture was styrenated with 57.4 grams of styrene and 4.13 grams of benzoyl peroxide. On removal of the solvent, a light-colored gelled product was obtained which formed a sheet with wood flour and whiting, the usual fillers, that did not cure in 30 days.

The above examples illustrate the type of product obtained by reacting hydoxyl containing nondrying oil esters with aryl olefins. In such oils as castor oil, the hydroxyl groups are present initially in the oil. The same effect may be obtained from oils in which hydroxyl groups are introduced by alcoholysis of the oil with polyols, such as glycol, glycerol, pentaerythritol, and the like.

*Example III*

200 grams of oxidized soya bean oil having a viscosity of 13.1 seconds Gardner-Holdt, 3 grams of maleic anhydride, and 200 ml. of toluene were refluxed for 6 hours at 110° C. to 115° C. The resulting ester was styrenated by refluxing with 200 grams of styrene and 2 grams of benzoyl peroxide. A homogeneous, clear, light-colored binder material was obtained. This formed a sheet with the usual fillers and cured in 460 hours. The indentation was 27.2%, and the bend break angle of the sheet was 37°.

*Example IV*

200 grams of oxidized soya bean oil from the same batch as was used in Example III were treated with 21 grams of maleic anhydride in 200 ml. of carbon tetrachloride and refluxed for 6 hours. At the end of that time, an insoluble gel had formed and no attempt was made to styrenate it.

Generally speaking, it is advantageous to carry out the reaction in the presence of aromatic hydrocarbon solvents, such as toluene. The advantages of such solvents over those such as carbon tetrachloride are illustrated by comparing Example III with Example IV.

*Example V*

200 grams of soya bean oil oxidized to a viscosity of 18 seconds at 30° C. Gardner-Holdt, 3.52 grams of acrylic acid, and 200 ml. of toluene were heated at 110° C. for 6 hours. 200 grams of styrene and 2 grams of benzoyl peroxide were added in 200 ml. toluene and the mixture was heated at 110° C. for 5 hours. The solvent was removed at reduced pressure and a clear, tough, thermoplastic gel was obtained.

In the practice of our invention, it is essential to avoid gel formation in the first stage of the reaction. This may be done by controlling the amount of alpha beta ethylenically unsaturated carboxylic acid ester in the mixture subjected to polymerization conditions, and also by controlling the conditions of oxidation of the oil.

In producing a floor covering binder from the copolymers of our invention, a mixture of about 5% to about 15% by weight of a resin such as ester gum, rosin-modified phenol-formaldehyde resin, diethylene glycol ester of hydrogenated rosin, and the like, and about 95% to about 85% of our copolymer may be used. The resin serves as a tackifying agent for the binder composition. Of course, conventional pigments, fillers, and the like may be admixed with the binder in proportions of about 30% to about 40% binder and about 70% to about 60% filler and pigment to produce a flooring composition.

This embodiment of our invention is illustrated by the following examples:

*Example VI*

175 grams of oxidized soybean oil, hydroxyl number 56, were esterified to an acid number of 8.6 by heating with 2.6 grams of fumaric acid in a refluxing toluene solution for eight hours. Styrenation was effected by refluxing a mixture of the esters with an equal quantity of styrene in toluene solution, using 1% benzoyl peroxide as a catalyst. Ten per cent ester gum was added as a modifier and the toluene was removed by reduced pressure distillation. The sheet prepared from this product according to the usual linoleum procedure cured in 412 hours to an indentation of 37%, bend-break angle 34°. Excellent alkali resistance was shown by the usual alkali indentation tests in which the sheet hardened slightly upon exposure to dilute alkali, % change in % indentation was —4.9%. This compares with a value of +10.9% for linoleum.

*Example VII*

150 grams of oxidized soybean oil, Gardner-Holdt viscosity 46 sec., were esterified with 1.5 grams of maleic anhydride. The esters were styrenated with 150 grams of styrene in refluxing toluene using 1% benzoyl peroxide as a catalyst. 30 grams of diethylene glycol ester of hydrogenated rosin were added as a modifier. The sheet prepared according to the usual procedure cured in 219 hours to an indentation of 37% and a bend-break angle of 39°. During the alkali resistance test it was noted that there was less softening of the sheet than with linoleum prepared from the usual binder. % change in % indentation was 7.8%; linoleum sheets showed a change of 10.9%.

The alkali indentation, the indentation, and the bend-break angle referred to herein were determined in accordance with procedures described in United States Patent No. 2,561,427.

The copolymers of our invention may also be used as ingredients of coating compositions; for example, print paints employed in the manufacture of printed felt base floor coverings. The products of our invention may also be employed as protective coatings which can be applied by brush, spray, and the like, to wood, glass, metal, and the like, and air dried or baked to form a clear homogeneous film. These coatings are characterized by excellent alkali resistance and water resistance.

This embodiment of our invention is illustrated by the following specific example:

*Example VIII*

200 grams of oxidized soya bean oil having a viscosity of 13.1 seconds Gardner-Holdt, 3 grams of maleic anhydride, and 200 ml. of toluene were refluxed for 6 hours at 110° C. 200 grams of styrene and 2 grams of benzoyl peroxide were added with more toluene and the mixture was heated at 110° C. for 5 hours. The resulting homogeneous solution was applied to a glass plate and air dried at room temperature to give a clear homogeneous film.

If desired, the usual reinforcing resins employed in the coating art may be added to the coatings of our invention. Examples of such reinforcing resins are melamine-formaldehyde resins, phenol-formaldehyde resins, urea-formaldehyde resins, and the like.

We claim:

1. A method of producing valuable polymers comprising esterifying a mixture the reactive ingredients of which consist of an oxidized nonfrosting vegetable siccative oil having a viscosity of not more than about 30 seconds on the Gardner-Holdt scale and an alpha beta ethylenically unsaturated carboxylic acid and copolymerizing the resulting ester with a compound consisting of a vinyl aromatic compound having a single vinyl group at elevated temperatures of about 60° C. to about 150° C.

2. A method of producing valuable polymers comprising refluxing a mixture the reactive ingredients of which consist of an oxidized nonfrosting vegetable siccative oil having a viscosity of not more than about 30 seconds on the Gardner-Holdt scale and an alpha beta ethylenically unsaturated dicarboxylic acid while dispersed in a hydrocarbon solvent and copolymerizing the resulting ester with a compound consisting of a vinyl aromatic compound having a single vinyl group in the presence of a hydrocarbon solvent at elevated temperatures of about 60° C. to about 150° C.

3. A method of producing valuable polymers comprising refluxing a mixture the reactive ingredients of which consist of an oxidized nonfrosting vegetable siccative oil having a viscosity of not more than about 30 seconds on the Gardner-Holdt scale and an alpha beta ethylenically unsaturated monocarboxylic acid while dispersed in a hydrocarbon solvent and copolymerizing the resulting ester with a compound consisting of a vinyl aromatic compound having a single vinyl group in the presence of a hydrocarbon solvent at elevated temperatures of about 60° C. to about 150° C.

4. A method of producing valuable polymers comprising esterifying a mixture the reactive ingredients of which consist of an oxidized nonfrosting vegetable siccative oil having a viscosity of not more than 30 seconds on the Gardner-Holdt scale and maleic acid and copolymerizing the resulting ester with a compound consisting of a vinyl aromatic compound having a single vinyl group at elevated temperatures of about 60° C. to about 150° C.

5. A method of producing valuable polymers comprising esterifying a mixture the reactive ingredients of which consist of an oxidized nonfrosting vegetable siccative oil having a viscosity of not more than about 30 seconds on the Gardner-Holdt scale and an alpha beta ethylenically unsaturated carboxylic acid and copolymerizing the resulting ester with a compound consisting of styrene at elevated temperatures of about 60° C. to about 150° C.

6. A copolymer consisting of a vinyl aromatic compound having a single vinyl group and an alpha beta ethylenically unsaturated carboxylic acid ester of an oxidized nonfrosting vegetable siccative oil having a viscosity of not more than about 30 seconds on the Gardner-Holdt scale.

7. A copolymer consisting of a vinyl aromatic compound having a single vinyl group of an alpha beta ethylenically unsaturated dicarboxylic acid ester of an oxidized nonfrosting vegetable siccative oil having a viscosity of not more than about 30 seconds on the Gardner-Holdt scale and a hydroxyl number of about 30 to about 50.

8. A copolymer consisting of a vinyl aromatic compound having a single vinyl group and an alpha beta ethylenically unsaturated monocarboxylic acid ester of an oxidized nonfrosting vegetable siccative oil having a viscosity of not more than about 30 seconds on the Gardner-Holdt scale and a hydroxyl number of about 30 to about 50.

9. A copolymer consisting of a vinyl aromatic compound having a single vinyl group and an alpha beta ethylenically unsaturated carboxylic acid ester of an oxidized linseed oil having a viscosity of not more than about 30 seconds on the Gardner-Holdt scale and a hydroxyl number of about 30 to about 50.

10. A copolymer consisting of a vinyl aromatic compound having a single vinyl group and an alpha beta ethylenically unsaturated carboxylic acid ester of an oxidized soya bean oil having a viscosity of not more than about 30 seconds on the Gardner-Holdt scale and a hydroxyl number of about 30 to about 50.

11. A copolymer consisting of a vinyl aromatic compound having a single vinyl group and a maleic acid ester of a linseed oil which has been oxidized to a viscosity of not more than about 30 seconds on the Gardner-Holdt scale and which has a hydroxyl number of about 30 to about 50.

12. A copolymer consisting of a vinyl aromatic compound having a single vinyl group and a maleic acid ester of a soya bean oil which has been oxidized to a viscosity of not more than about 30 seconds on the Gardner-Holdt scale and which has a hydroxyl number of about 30 to about 50.

13. A copolymer consisting of styrene and the maleic acid ester of oxidized linseed oil having a viscosity of not more than about 30 seconds on the Gardner-Holdt scale and a hydroxyl number of about 30 to about 50.

14. A copolymer consisting of a vinyl aromatic compound having a single vinyl group and an alpha beta ethylenically unsaturated carboxylic acid ester of an oxidized nonfrosting vegetable siccative oil having a viscosity of not more than about 30 seconds on the Gardner-Holdt scale containing at least about 35% by weight of at least one acid of the group consisting of linoleic and linolenic.

15. A copolymer consisting of about 33% to about 67% by weight vinyl aromatic compound having a single vinyl group and about 67% to about 33% by weight of the alpha beta ethylenically unsaturated carboxylic acid ester of an oxidized nonfrosting vegetable siccative oil having a viscosity of not more than about 30 seconds on the Gardner-Holdt scale.

16. A copolymer consisting of about 50% by weight copolymerized vinyl aromatic compound having a single vinyl group and about 50% by weight copolymerized alpha beta ethylenically unsaturated carboxylic acid ester of oxidized nonfrosting vegetable siccative oil having a viscosity of not more than about 30 seconds on the Gardner-Holdt scale.

17. A copolymer consisting of about 33% to about 67% by weight copolymerized styrene and about 67% to about 33% by weight of a maleic acid ester of oxidized linseed oil having a viscosity of not more than about 30 seconds on the Gardner-Holdt scale.

18. A copolymer consisting of about equal parts by weight of styrene and a maleic acid ester of oxidized soya bean oil having a viscosity of not more than about 30 seconds on the Gardner-Holdt scale.

19. A floor covering binder comprising a tackifying resin selected from the group consisting of ester gum, rosin-modified phenol-formaldehyde resin, and diethylene glycol ester of hydrogenated rosin and a copolymer consisting of a vinyl aromatic compound having a single vinyl group and an alpha beta ethylenically unsaturated carboxylic acid ester of an oxidized nonfrosting vegetable siccative oil having a viscosity of not more than about 30 seconds on the Gardner-Holdt scale.

20. A floor covering binder comprising about 5% to about 15% by weight of a tackifying resin selected from the group consisting of ester gum, rosin-modified phenol-formaldehyde resin, and diethylene glycol ester of hydrogenated rosin and about 95% to about 85% by weight of a copolymer of consisting of a vinyl aromatic compound having a single vinyl group and an alpha beta ethylenicaly unsaturated carboxylic acid ester of an oxidized nonfrosting vegetable siccative oil having a viscosity of not more than about 30 seconds on the Gardner-Holdt scale.

21. A floor covering binder comprising about 5% to about 15% by weight of ester gum and about 95% to about 85% by weight of a copolymer consisting of styrene and a maleic acid ester of oxidized soya bean oil having a viscosity of not more than about 30 seconds on the Gardner-Holdt scale.

22. A floor covering binder comprising about 5% to about 15% by weight of a diethylene glycol ester of hydrogenated rosin and about 95% to about 85% by weight of a copolymer consisting of styrene and a maleic acid ester of oxidized soya bean oil having a viscosity of not more than about 30 seconds on the Gardner-Holdt scale.

23. A coating composition comprising a hydrocarbon solvent and a copolymer consisting of a vinyl aromatic compound having a single vinyl group and an alpha beta ethylenically unsaturated carboxylic acid ester of an oxidized nonfrosting vegetable siccative oil having a viscosity of not more than about 30 seconds on the Gardner-Holdt scale.

References Cited in the file of this patent

UNITED STATES PATENTS

| | | |
|---|---|---|
| 2,346,858 | Mighton | Apr. 18, 1944 |
| 2,414,525 | Hill et al. | Jan. 21, 1947 |

FOREIGN PATENTS

| | | |
|---|---|---|
| 609,749 | Great Britain | Oct. 6, 1948 |